United States Patent
Mezouari

(10) Patent No.: US 7,475,999 B2
(45) Date of Patent: Jan. 13, 2009

(54) ILLUMINATION OF VEHICLE INSTRUMENT

(75) Inventor: Samir Mezouari, Essex (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/740,126

(22) Filed: Apr. 25, 2007

(65) Prior Publication Data
US 2008/0002386 A1 Jan. 3, 2008

(30) Foreign Application Priority Data
Apr. 26, 2006 (GB) .................. 0608246.5

(51) Int. Cl.
*G01D 11/28* (2006.01)
(52) U.S. Cl. ............... 362/26; 362/27; 362/29
(58) Field of Classification Search .......... 362/23, 362/26, 27, 29
See application file for complete search history.

(56) References Cited

U.S. PATENT DOCUMENTS 4,771,368 A * 9/1988 Tsukamoto et al. .......... 362/29
5,291,851 A * 3/1994 Muramatsu ................ 116/286
7,293,904 B2 * 11/2007 Beitelspacher ............. 362/555

FOREIGN PATENT DOCUMENTS

JP 11030534 2/1999

* cited by examiner

*Primary Examiner*—Thomas M Sember
(74) *Attorney, Agent, or Firm*—Brinks Hofer Gilson & Lione

(57) ABSTRACT

An instrument suitable for use in a vehicle and having a dial with an information bearing front surface and a pointer for indicating information on the front surface. The pointer is pivotable about a first axis that extends through the hub and is substantially perpendicular to the plane of the dial. The instrument includes first and second light sources which are both located behind the dial, generally in registry with the pointer assembly. The instrument further includes a first light deflector that deflects light from the first light source along the pointer to back light the pointer, and second light deflector that deflects light from the second light source towards the front surface to front light that surface.

22 Claims, 3 Drawing Sheets

ILLUMINATION OF VEHICLE INSTRUMENT

BACKGROUND

Field of the Invention

The present invention relates to illumination of instruments, gages and dials, and particularly to instruments suitable for use in a vehicle.

Instruments for displaying information on a vehicle display are usually located on the instrument panel of an automotive vehicle, and require some form of illumination to allow the driver to read the information when it is dark. An instrument usually comprises a panel or face having an information bearing region, and a housing having a transparent cover to protect the instrument. The information bearing region usually has symbols, such as graphics, numbers or a dial, indicating a scale and a pointer for indicating a point within the scale. The information bearing region may also include features such as rings defining the perimeter of a particular instrument, gauge or dial (hereafter "instrument".

The instrument is generally mounted on a printed circuit board (PCB) that is connected to sensors (directly or indirectly via a network) which monitor certain engine conditions, such as speed, temperature and fuel level, to name but a few. Conventionally, a number of instruments may be mounted together to form an instrument cluster. Many modern instrument clusters comprise a single panel or back plate having a number of information bearing regions corresponding to the various instruments, for example speedometer, rev counter, engine temperature etc.

Vehicle instruments can be front lit or back lit. Front lit instruments are illuminated from the viewing side of the information bearing surface, and light is reflected off the information bearing surface towards a vehicle occupant. Back lit instruments are illuminated from the side opposite to the viewing side of the instrument. In the case of back lighting, the information bearing surface contains opaque or semiopaque portions comprising symbols, so that light passing through the information bearing surface renders these symbols visible.

Back lit instruments have a pleasant overall appearance because the lighting components are generally not visible to a vehicle occupant. Front lighting can produce a more appealing effect than back lighting, however the lighting components in front lit instruments tend to be mounted in front of the instrument panel, and are therefore often visible to the vehicle occupant, which detracts from the aesthetic appeal of the instrument.

Front or back lighting may be achieved either by providing light directly from a light source (which may include the use of reflective surfaces), or indirectly from a light source that is coupled to a light guide and directs light from the light source to the required illumination point. A problem with known front lit instruments is that while front lighting allows for a simpler design of the information bearing surface and the pointers, any cost savings that result from such simplified designs are negated by the extra costs required for flexible connectors from the PCB (which is located behind the instrument panel) to the light source or complex light guides (which are generally located in front of the instrument panel), and for more complex assembly.

Front lighting from a point source also often produces shadows. Back lighting, on the other hand, usually involves the use of a plurality of light sources, and a more complex arrangement is required to illuminate the pointer. Furthermore, applying symbols to the information bearing surface is more complex in the case of back lighting, because poor distribution of the illumination can cause portions of the instrument to have better illumination than others. This is often compensated for by using an instrument panel having some areas which are more optically opaque than others.

Japanese patent document JP11030534 discloses an instrument illuminated by light sources that are all located behind the panel or dial surface. The instrument is back lit by light sources located near the center of the dial, and front lit by light sources located around the outer periphery of the dial via reflection from a reflection element located around the dial.

As customers become more sophisticated in their requirements, it becomes important to provide lighting for vehicle instruments that is both distinctive and cost effective to produce.

SUMMARY OF THE INVENTION

According to the principles of the present invention, there is provided an instrument suitable for use in a vehicle. The instrument includes a dial having an information bearing front surface.

A pointer assembly comprising a pointer having a hub and a needle is used for indicating information on the front surface. The needle extends radially from the hub, and the pointer is mounted in front of the dial adjacent to the information bearing front surface so as to rotatable about a first axis extending through the hub and substantially perpendicular to the plane of the dial. Light sources are located behind the dial and directly behind the pointer assembly.

A light deflecting means deflects light from a first light source along the pointer to back light the pointer. A second light deflecting means deflects light from a second light source towards the information bearing front surface to front light this surface.

As seen from above, the invention achieves both front lighting and back lighting of the instrument from light sources mounted behind the dial. The benefits of front lighting as discussed above are therefore achieved without the need for mounting the light sources in front of the dial. The combination of back lighting and front lighting in a single instrument results in a pleasant aesthetic.

The first and second light sources are both located directly behind the pointer assembly and are preferably substantially centrally located behind the dial. In this position, the light sources are close to the other electronics, such as the pointer motor, which allows a smaller PCB to be used. Preferably the first and second light deflecting means are located proximate to the first axis, and most preferably the pointer assembly comprises the first and second light deflecting means. This arrangement means that the illumination system is very compact as all the lighting components are associated with the pointer assembly, and are hence substantially centrally located on the dial and occupy a relatively small area.

The centrally located first and second light sources produce a pleasant illumination pattern on the dial. The illumination pattern is bright at the center of the dial and gets evenly dimmer towards the outer periphery of the dial. By using separate first and second light sources to illuminate the pointer and the dial, respectively, a number of interesting effects can be achieved. The pointer is illuminated completely independently from the dial and so, for example, the pointer and dial could be illuminated by different colored light. Furthermore, the first and second light sources could have different brightnesses so that the contrast between the dial and the pointer can be varied. Separate dimmer functions may be associated with the first and second light sources to allow the contrast between pointer and dial to be continuously varied.

Preferably the first and second light sources emit light from substantially concentric annular regions centered about the first axis. The first light source preferably comprises a plurality of first light emitting diodes (LEDs) arranged in a first ring centered about the first axis, and the second light source preferably comprises a plurality of second LEDs arranged in a second ring centered about the first axis. The radius of the second ring is greater than the radius of the first ring such that the first LEDs form an inner ring, and the second LEDs form an outer ring. In most applications, the radius of the first ring is preferably between 2 and 5 mm, and more preferably about 3.5 mm. The radius of the second ring is preferably between 5 and 10 mm, and more preferably about 8.5 mm. The first and second LEDs are preferably each mounted directly to a PCB located behind the dial. Mounting the light sources directly on the PCB negates the requirement for flexible connectors or light guides and thus reduces cost.

The first light deflecting means is preferably a reflective first surface of the pointer needle, this first surface being angled to deflect light from the first light source along the needle to illuminate the needle. The first surface is preferably radially offset from the first axis by a distance substantially equal to the radius of the inner ring of first LEDs. In this way the first surface remains substantially opposite the first light source as the pointer rotates.

The second light deflecting means is preferably located in front of the dial and deflects light from the second light source back towards the information bearing front surface of the dial to achieve front lighting of the dial from a light source located behind the dial. The second light deflecting means is preferably a substantially annular wall having an inner surface facing towards the first axis, and an outer surface facing away from the first axis. The wall is preferably substantially optically transparent. The inner surface is reflective and arranged to deflect light by total internal reflection towards the outer surface, and the outer surface is arranged to refract light towards the information bearing front surface of the dial. The reflective inner surface is preferably substantially funnel or cone shaped and has a radius substantially equal to the radius of the outer ring of second LEDs. In this way, it is centered about the first axis such that the inner surface is substantially opposite to the outer ring of second LEDs. In one embodiment of the invention, the annular wall extends from the outer circumference of the pointer hub, and in certain other embodiments of the invention the annular wall is part of a separate light deflecting element associated with the pointer assembly.

The first and second light sources are preferably substantially optically isolated from one another such that the light from the first light source is substantially decoupled from the light from the second light source. Preferably, the first and second light sources are separated from one another by substantially optically opaque means, and more preferably by light deflecting walls. The light deflecting walls are preferably made from acrylonitrile-butadiene-styrene (ABS), however any other light reflecting/diffusing material is suitable.

The light deflecting walls preferably include a first tube arranged with its tubular axis coincident with the first axis and having a radius larger than the inner ring of first LEDs, and smaller than the outer ring of second LEDs such that the first tube is located between the inner and outer rings of LEDs. The light deflecting walls also preferably include a second tube arranged with its tubular axis coincident with the first axis and having a radius larger than the outer ring of second LEDs and arranged to surround said outer ring. The light deflecting walls may further include a third tube having a tubular axis coincident with the first axis and having a radius smaller than the inner ring of LEDs. The light deflecting walls preferably extend between the PCB and the dial. In addition to isolating the first and second light sources, the light deflecting walls serve to channel light towards the first and second light deflecting means.

Preferably the light sources emit light according to a cone of viewing angle that is less than about 60 degrees.

In one embodiment of the invention, the second light deflecting means for deflecting light onto the dial is formed from one of the tubular light deflecting walls. In this embodiment an upper end of one of the tubular walls is funnel shaped and projects through an aperture in the dial. The funnel shaped end has a curved outer reflective surface which is radially offset from the first axis by a distance substantially equal to the radius of the outer ring of second LEDs, and hence light from the second LEDs is deflected by this curved surface towards the face of the dial.

The first and second light sources are located directly behind the pointer assembly, and all the lighting components are preferably located proximate to the first axis, and substantially behind the pointer hub. This allows a small PCB to be used. Preferably the pointer assembly includes a light absorbing cap located over the pointer hub which absorbs undeflected light from the first and second light sources, thus preventing the light from being transmitted towards a vehicle occupant. The light absorbing cap is preferably substantially circular and has a radius in excess of the radius of the outer ring of second LEDs to substantially obscure the area occupied by the first and second light sources from view, and hence obscures the lighting components from view. The light absorbing cap also protects the lighting components. Usually the instrument also includes a transparent front panel to protect the instrument and its components from dust, scratches and knocks.

The color of the first LEDs may be the same as, or different from, the color of the second LEDs. Furthermore, the first and/or second light sources may comprise a number of different colored LEDs. For example, the first ring of LEDs may include a number of different colored LEDs so that the pointer changes colour as it rotates. For example green LEDs may be located around the dial up to a certain point, and then red LEDs could be used thereafter. Such a system could provide a visual signal to the driver (the pointer turning from green to red) if the vehicle exceeds a predetermined speed (for example 70 mph).

The invention is not limited to using a plurality of LEDs as the light sources. For example a suitable annular light guide coupled to one or more light sources could be used, as could a bundle of fibre optic cables arranged in a ring and coupled to a light source. Using a plurality of LEDs mounted directly to the PCB is advantageous, however, as flexible connectors from the PCB to the light sources are not required.

BRIEF DESCRIPTION OF THE DRAWINGS

The invention will now be further described, by way of example, with reference to the following drawings in which.

DETAILED DESCRIPTION

Figure 1A:
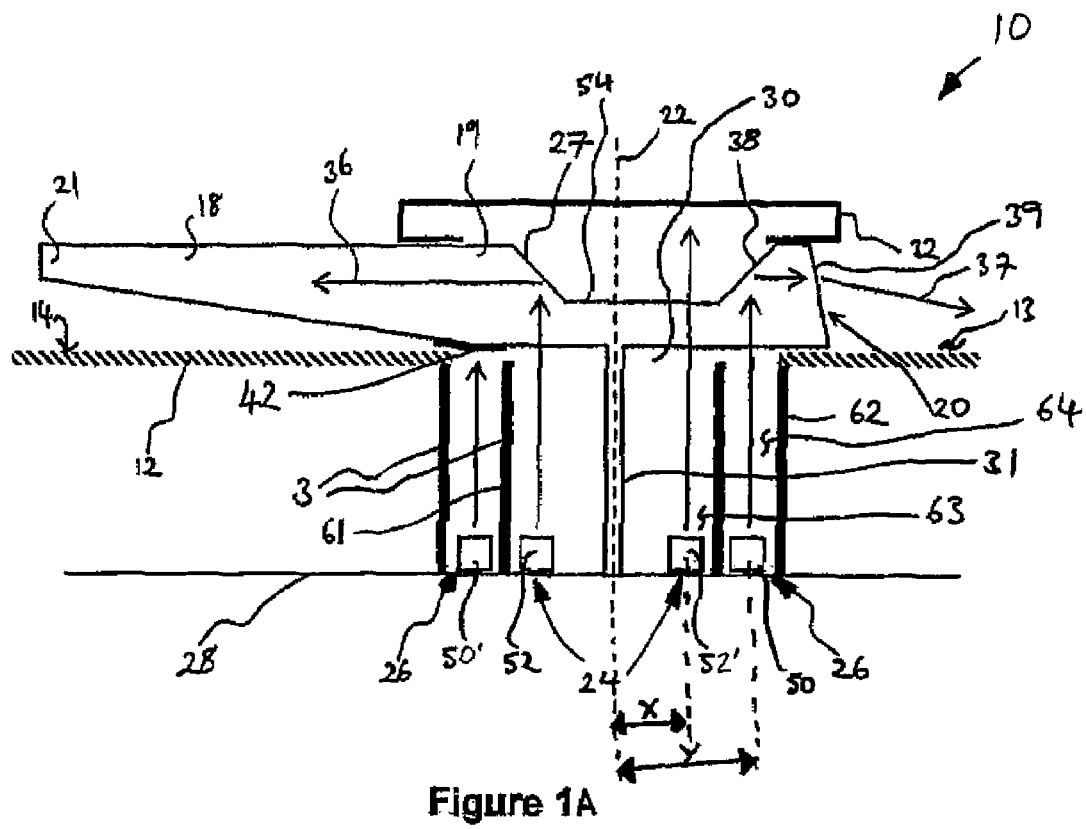
FIG. 1A is a diagrammatic cross-section through an instrument according to a first embodiment of the invention, including a pointer assembly having a pointer hub which deflects light towards the dial.

Referring now to FIG. 1A, seen therein is a diagrammatic cross-section through part of an instrument according to a first embodiment of the present invention. The instrument 10 comprises a dial 12 having an information bearing front surface 14, which may include numbers and other marks (not shown). The instrument 10 also includes a pointer assembly 16 (shown in isolation in FIG. 1B) comprising a pointer 17 having a pointer hub 20 and a needle 18, a spindle 31 and a light absorbing cap 32. The pointer hub 20 is substantially circular, and the needle 18 extends radially from the hub 20. The needle 18 and hub 20 are mounted in front of the dial 12 on the viewing side 13 of the information bearing surface 14. The spindle 31 extends centrally from the underside of the hub 20 and extends perpendicular to the plane of the dial 12. The needle 18 is able to pivot or rotate about a first axis (indicated by the dotted line 22) which is perpendicular to the plane of the dial 22 and coincident or coaxial with the spindle 31.

A first light source 24 and a second light source 26 are located behind the dial 12. The first light source 24 comprises a plurality of first LEDs (of which LEDs 52 can be seen in FIG. 1A) arranged in a first ring about the first axis 22. Each first LED is mounted to a PCB 28 at a first radial distance of about 3.5 millimeters (indicated by dimension X in FIG. 1A) from the first axis 22. The second light source 26 comprises a plurality of second LEDs (of which LEDs 50 can be seen in this cross-section) arranged in a second ring about the first axis 22. Each second LED 50 is mounted to the PCB 28 at a second radial distance of about 8.5 millimeters (indicated by dimension Y) from the first axis 22. The second radial distance Y is greater than the first radial distance X such that the radius of the ring of second LEDs 50 of the second light source 26 is greater than the radius of the ring of first LEDs 52 of the first light source 24. In other words, the first and second rings are concentric, with the first LEDs 52 forming the inner ring, and the second LEDs 50 forming the outer ring. Preferably, the first light source 24 and the second light source 26 comprise LEDs that have a full viewing angle less than about 60 degrees.

As seen in FIG. 1A, the pointer needle 18 has a proximal end 19 and a distal end 21. The proximal end 19 is affixed to or formed with the pointer hub 20, and the distal end 21 is used to point to information on the dial 12. The proximal end 19 has a first surface 27 (best seen in FIGS. 1A and 1C) which is radially offset from the first axis 22 by a distance substantially equal to the radius of the inner ring of first light source 24, such that the first surface 27 remains substantially opposite to the first LEDs 52 as the needle 18 rotates. The first surface 27 is reflective and inclined relative to the plane of the dial to deflect light from the first light source 24 along and out through a viewed surface of the needle 18.

Figure 1B:
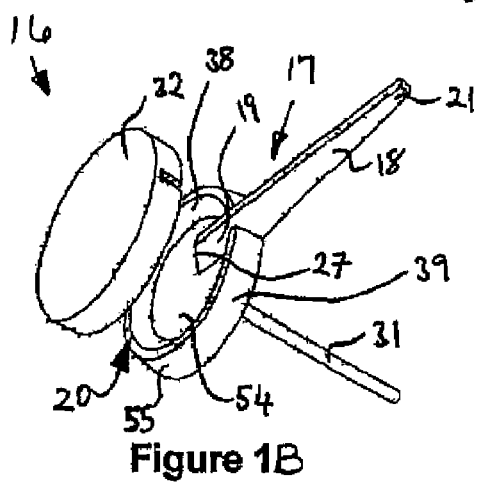
FIG. 1B is an exploded perspective view of the pointer assembly seen in FIG. 1A.
Figure 1C:
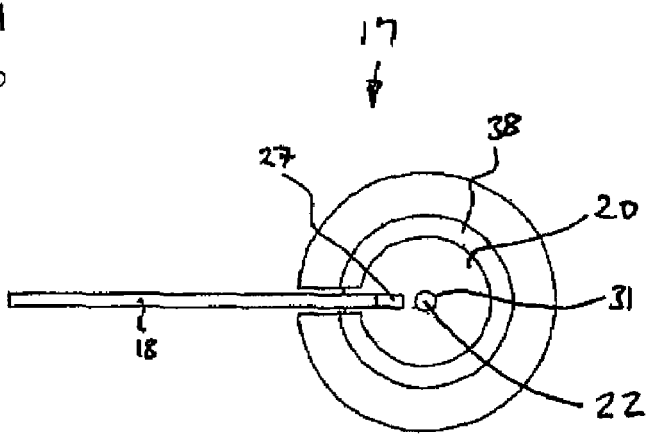
FIG. 1C is a top view of the pointer assembly of FIG. 1B without the light absorbing cap.

As seen in FIG. 1B, the pointer hub 20 is bowl-shaped and generally comprises a flat circular base portion 54 with a circumferential wall 55. The circumferential wall 55 has an inner surface 38 which faces towards the first axis 22, and an outer surface 39 which faces away from the first axis 22. The pointer 17 is mounted such that the flat base portion 54 of the hub 20 is substantially parallel with the plane of the dial 12. The hub 20 is substantially optically transparent and able to deflect light. The inner surface 38 is radially offset from the first axis 22 by a distance substantially equal to the radius of the outer ring of formed by the second light source 26, such that the inner surface 38 is substantially opposite to the outer ring of second LEDs 50. The inner surface 38 is reflective and inclined relative to the plane of the dial 12.

A section of light absorbing material 42 (FIG. 1) is located on the underside of the needle 18 and offset from the first axis 22 by a distance substantially equal to the radius of the outer ring of second light source 26, such that the light absorbing material 42 remains substantially opposite to the outer ring of the second LEDs 26 as the needle 18 rotates. As such, the light absorbing material 42 prevents light from the second light source 26 from illuminating the pointer needle 18.

Light deflecting walls 3 extend substantially perpendicular to the plane of the dial 12 between the dial 12 and the PCB 28. The light deflecting walls 3 are made of ABS or other reflecting/diffusing material, and serve to channel light from the light sources 24, 26 as efficiently as possible towards the light deflecting surfaces 27, 28. The light deflecting walls 3 comprise a first tube 61 and a second tube 62. The first and second tubes 61, 62 are arranged such that their tubular axes are substantially coincident or coaxial with the first axis 22.

The radius of the second tube 62 is larger than the radius of the outer ring of the second light source 26. The radius of the first tube 61 is larger than the radius of the inner ring of the first light source 24, but smaller than the radius of the outer ring of the second light source 26. The inner ring of first light source 24 is located in a first region 63 enclosed by the first tube 61, and the outer ring of the second light source 26 is located in a second region 64 between the first and second tubes 61, 62. The first tube 61 therefore separates the first and second light sources 24, 26 and hence decouples the light from the first light source 24 from the light from the second light source 26.

The dial 12 has a substantially circular aperture 30 centered on the first axis 22 and has a radius substantially equal to the radius of the second tube 62. The pointer hub 20 is located above the aperture 30, and a light absorbing cap 32 is located over the hub 20 to obscure the light sources 24, 26 from the view of a vehicle operator. The light absorbing cap 32 is substantially circular and preferably has a radius larger than the radius of the second tube 62 in order to obscure all the lighting components which are located within the second tube 62.

The process of illumination of the instrument is now described with reference to FIG. 1A. In FIG. 1A the needle 18 is shown pointing leftwards. It can be seen from FIG. 1 that light from LED 50 is deflected by the inner surface 38 of the circumferential hub wall 55, towards the outer surface 39, by total internal reflection. This light is then refracted at the outer surface 39 towards the information bearing front surface 14 of the dial 12 (in the direction of arrow 37) to illuminate the information bearing surface 14. At the same time, light from the LED 52, which forms part of the inner ring of the first light source 24, is deflected by the first surface 27 of the proximal end 19 of the needle 18 along the needle 18 (in the direction of arrow 36) to illuminate the needle 18.

Light from one or more LEDs 50', which form part of the inner ring of the first light source 24, passes straight through the flat base portion 54 of the pointer hub 20, without being deflected, and is absorbed by the light absorbing cap 32. Light from one or more LEDs 50', which form part of the outer ring of second LEDs 26, is absorbed by the section of light absorbing material 42 located beneath the pointer needle 18 and, as such, does not provide any illumination to the needle 18 when the needle 18 is located above it in this position.

When the needle 18 has rotated by 180°, such that it points rightwards (not shown), designated as 50', will be illuminating the information bearing front surface 14, light from the LED 52 will be blocked by the light absorbing cap 32, light from the LED 52' will illuminate the pointer, and light from LED 50 will be absorbed by the section of light absorbing material 42.

Figure 2A:
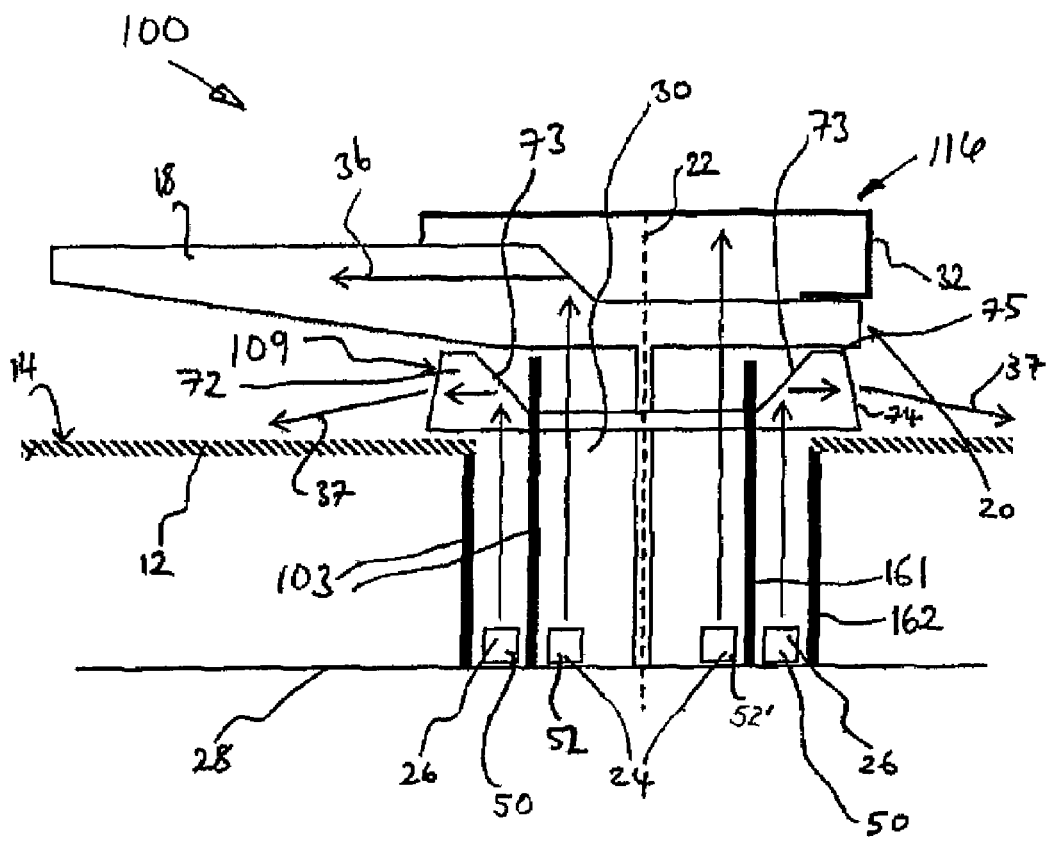
FIG. 2A is a diagrammatic cross-section through an instrument according to a second embodiment of the invention, including a separate light deflecting element located between the pointer and the dial for deflecting light towards the dial.
Figure 2B:
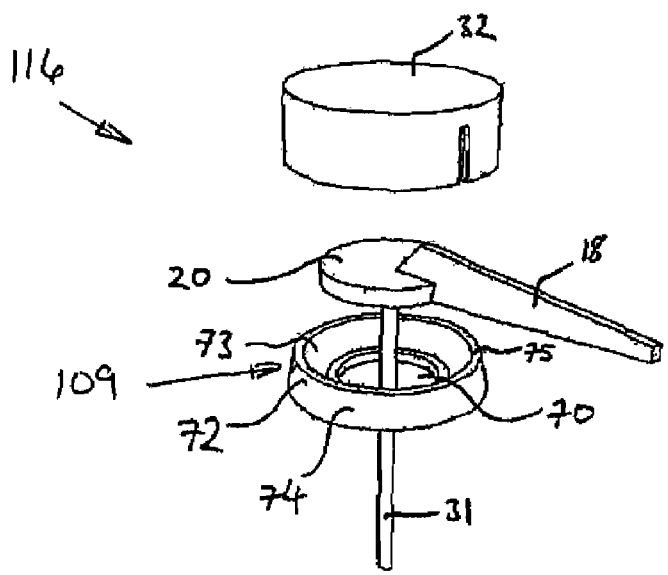
FIG. 2B is an exploded perspective view of the pointer assembly of FIG. 2A.

FIG. 2A is a diagrammatic cross-section through an instrument 100 according to a second embodiment of the invention. The second embodiment is similar to the first embodiment shown in FIGS. 1A to 1C and, therefore, common elements bear common references numerals. The second embodiment, however, incorporates a separate deflection element 109 for deflecting light (shown by arrows 37) towards the information bearing front surface 14 of the dial 12. FIG. 2B is an exploded perspective view of the pointer assembly 116 shown in FIG. 2A, which includes a disc shaped hub 20, a needle 18 radially mounted to the hub 20, a spindle 31 which extends axially from the hub 20, a light deflecting element 109, and a light absorbing cap 32 positioned over the hub 20.

The light deflection element 109 is substantially annular and comprises a central hole 70 and a circumferential wall 72. As best seen in FIG. 2B, the circumferential wall 72 has a funnel shaped inner surface 73 which faces towards the first axis 22, and an outer surface 74 which faces away from the first axis 22. As best seen in FIG. 2A, the inner surface 73 is radially offset from the first axis 22 by a distance substantially equal to the radius of the outer ring of the second light source 26 such that the inner surface 73 is substantially opposite the LEDs of the outer ring of the second light source 26. The inner surface 73 is reflective and is inclined with respect to the plane of the dial 12. Light from the outer ring of the second light source 26 is deflected by the inner surface 73 of the circumferential hub wall 55, towards the outer surface 74, by total internal reflection. This light is then refracted at the outer surface 74 towards the information bearing front surface 14 of the dial 12 (in the direction of arrow 37) to illuminate the dial 23.

The deflection element 109 is made from clear polycarbonate (PC) or polymethyl methacrylate (PMMA) or any substantially optically transparent material capable of redirecting light by total internal reflection.

In this second embodiment, the deflection element 109 is generally located between the pointer 18 and the dial 12. The radius of the deflection element 109 is larger than the radius of the aperture 30 in the dial 12 to prevent the deflection element 9 from falling through the aperture 30. The light absorbing cap 32 is located over the pointer hub 20 obscure the light sources 24, 26 from view.

The light deflecting walls 103 in the second embodiment are arranged slightly differently to those in the first embodiment shown in FIG. 1. In the second embodiment, the first tube 161 is longer than the second tube 162, and extends through the aperture 30 in the dial 12 and through the central hole 70 in the deflecting element 9. The first tube 61 extends to a height substantially equal to the top 75 of the circumferential wall 72 of the deflection element 109, and the pointer hub 20 sits on top of the first tube 161 and deflection element 109.

The separate deflection element 109 in the second embodiment enables a substantially symmetrical distribution of light over the dial 12 including in the region directly beneath the pointer needle 18. In that the deflection element 109 is located between the needle 18 and dial 12, no shadowing is caused by the needle 18 as the light is deflected from behind the needle 18.

In the second embodiment, light from second LEDs 50 continually illuminate the dial 12 independent of the rotation of the needle 18. When the needle 18 is pointing leftwards as shown in FIG. 2, LED 52 illuminates the needle 18, and light from LED 52' passes straight through the deflection element 109 and pointer hub 20, without being deflected, and is absorbed by the absorbing cap 32. When the pointer rotates 180°, light from LED 52 will be blocked by the cap 32, and light from LED 52' will illuminate the pointer.

Although not shown in FIG. 2A, light absorbing material (similar to the light absorbing material 42 in FIG. 1A) could be placed beneath the pointer needle 18 to block further light from the LEDs 50.

Figure 3:
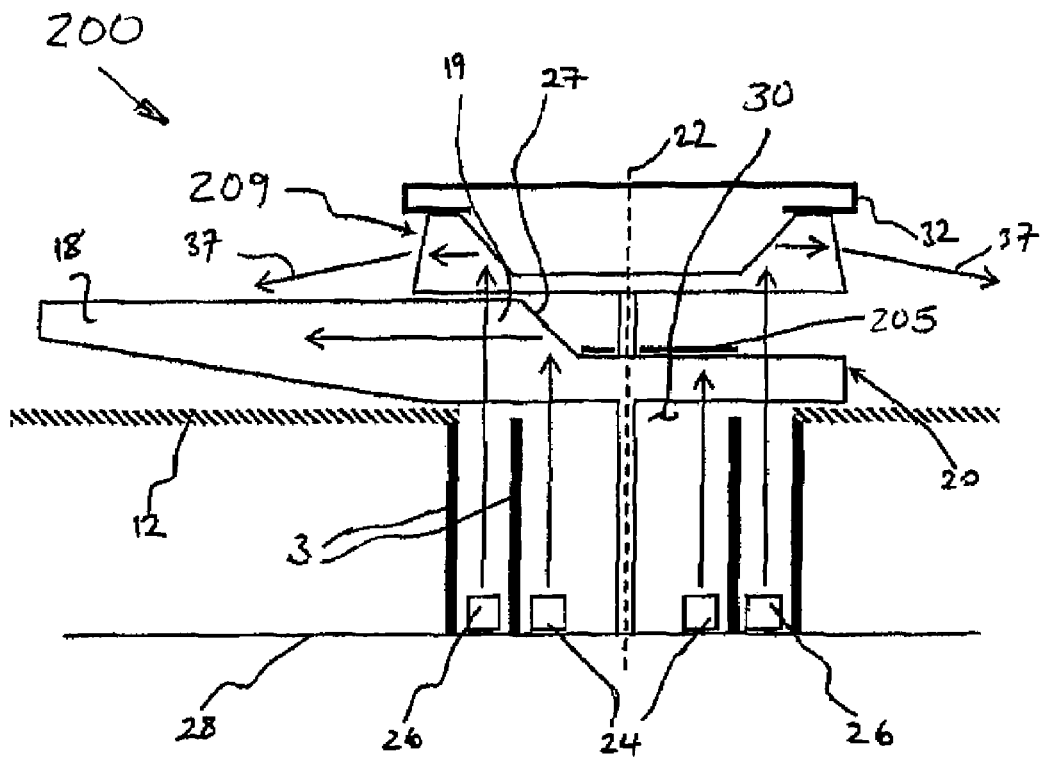
FIG. 3 is a diagrammatic cross-section through an instrument according to a third embodiment of the invention, including a separate light deflecting element located between the pointer and the light absorbing cap for deflecting light towards the dial.

FIG. 3 is a cross-section through an instrument 200 according to a third embodiment of the invention. This third embodiment incorporates a deflection element 209 and pointer similar to the deflection element and pointer shown in FIG. 2A. In the third embodiment, however, the pointer 18 is located adjacent the dial 12 and the deflection element 209 is located in front of the pointer 18, and between the pointer 18 and the light absorbing cap 32.

In order to minimise light leakage from the first light source 24 into the deflection element 209, a piece of light absorbing material 205 is disposed over a portion of the pointer hub 20, between the hub 20 and the deflection element 209, to absorb light from the inner ring formed by the LEDs of the first light source 24.

In this third embodiment the pointer needle 18 will cause minor shadowing. However, a larger area of the dial 14 is illuminated than in the first and second embodiments because the deflecting element 209 is located further away from the dial 12.

Figure 4:
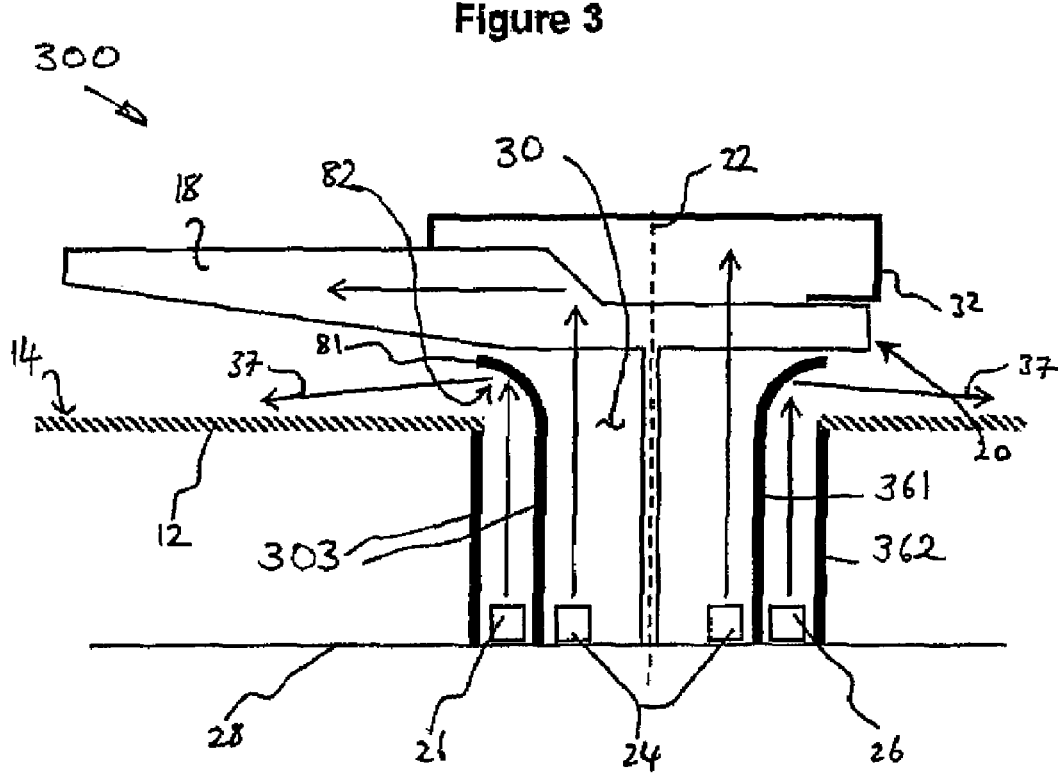
FIG. 4 is a diagrammatic cross-section through an instrument according to a fourth embodiment of the invention, including a funnel shaped reflective surface located between the pointer and the dial for deflecting light towards the dial.

A fourth embodiment of the invention is shown in FIG. 4. The pointer 18 and the light absorbing cap 32 are similar to the pointer and light absorbing cap 32 in the second embodiment shown in FIG. 2A. In this fourth embodiment however, a portion of the light deflecting walls 303 provides the means for deflecting light onto the dial 12. In this embodiment, a first end 81 of a first tubular wall 361 is funnel shaped or curved radially outward and projects through the aperture 30 in the dial 12. The funnel shaped first end 81 has a curved outer reflective surface 82, which is radially offset from the first axis 22 by a distance substantially equal to the radius of the outer ring formed by the LEDs of the second light source 26 such that the reflective surface 82 is opposite to the second light source 26, and hence light from the second light source 26 is deflected by this curved reflective surface 82 towards the information bearing front surface 14 of the dial 12. This arrangement of an instrument 300 provides a substantially even distribution of light around the entire circumference of the dial 12 and does not result in shadowing or dark spots beneath the pointer 18.

It should be understood that the invention has been described by way of example only and that modifications in detail may be made without departing from the scope of the invention as defined in the claims.

The invention claimed is:

1. An instrument suitable for use in a vehicle and comprising:
   a dial defining a plane and having an information bearing front surface;
   a pointer assembly rotatably mounted to indicate information on said front surface, the pointer assembly having a hub and a needle, the needle extending radially from the hub, and the pointer assembly being mounted adjacent to the front surface of the dial and being pivotable about a first axis that is substantially perpendicular to the plane of the dial;
   first and second light sources, both light sources being located on a side opposite of the front surface of the dial;
   a first light deflector located within the hub of the pointer assembly to deflect light from the first light source along the pointer so as to back light the pointer; and
   a second light deflector located to deflect light from the second light source towards the information bearing front surface so as to front light the information bearing front surface.

2. An instrument as claimed in claim 1, wherein the first and second light sources are both located proximate to the first axis and substantially in registry with the pointer hub.

3. An instrument as claimed in claim 1, wherein the first and second light deflectors means are both located proximate the first axis.

4. An instrument as claimed in claim 1, wherein the first and second light deflecting means are part of the pointer assembly.

5. An instrument as claimed in claim 1, wherein the first light source is a different color from the second light source.

6. An instrument suitable for use in a vehicle and comprising:
   a dial defining a plane and having an information bearing front surface;
   a pointer assembly rotatably mounted to indicate information on said front surface, the pointer having a hub and a needle, the needle extending radially from the hub, and the pointer being mounted adjacent to the front surface of the dial and being pivotable about a first axis that is substantially perpendicular to the plane of the dial;
   first and second light sources, both light sources being located on a side opposite of the front surface of the dial, the first light source generally defining a first annular region and the second light source generally defining a second annular region, said first and second annular regions being centered about the first axis;
   a first light deflector located to deflect light from the first light source along the pointer so as to back light the pointer; and
   a second light deflector located to deflect light from the second light source towards the information bearing front surface to front light the information bearing front surface.

7. An instrument suitable for use in a vehicle and comprising:
   a dial defining a plane and having an information bearing front surface;
   a pointer assembly rotatably mounted to indicate information on said front surface, the pointer having a hub and a needle, the needle extending radially from the hub, and the pointer being mounted adjacent to the front surface of the dial and being pivotable about a first axis that is substantially perpendicular to the plane of the dial;
   first and second light sources, both light sources being located on a side opposite of the front surface of the dial, the first light source including a plurality of first LEDs arranged in a first ring centered about the first axis, and the second light source including a plurality of second LEDs arranged in a second ring centered about the first axis;
   a first light deflector located to deflect light from the first light source along the pointer so as to back light the pointer; and
   a second light deflector located to deflect light from the second light source towards the information bearing front surface to front light the information bearing front surface.

8. An instrument as claimed in claim 7, wherein each of the first and second LEDs is mounted directly to a PCB located on a side of the dial opposite of the front surface.

9. An instrument as claimed in claim 7, wherein the first ring of first LEDs comprises at least one LED having a first color and at least one LED having a second color, said first color being different from said second color such that the pointer needle changes color as it rotates.

10. An instrument as claimed in any one of claim 7, wherein the first light deflector is a reflective first surface of the needle, said first surface being angled to deflect light from the first light source along the needle to illuminate the needle.

11. An instrument as claimed in claim 10, wherein the reflective first surface of the needle is radially offset from the first axis by a distance substantially equal to a radius of the first ring of the first LEDs.

12. An instrument as claimed in any one of claim 7, wherein the second light deflector comprises a substantially annular wall having an inner surface facing towards the first axis and an outer surface facing away from the first axis, the annular wall being substantially optically transparent, the inner surface being a reflective surface arranged to deflect light by total internal reflection towards the outer surface, and the outer surface being arranged to refract light towards the information bearing front surface of the dial.

13. An instrument as claimed in claim 12, wherein the inner surface is inclined relative to the plane of the dial and radially offset from the first axis by a distance substantially equal to the radius of the second ring of the second LEDs.

14. An instrument as claimed in claim 12, wherein the inner surface is substantially funnel shaped.

15. An instrument as claimed in any one of claim 12, wherein the inner surface is a surface of the pointer hub.

16. An instrument as claimed in any one of claim 12, wherein the pointer hub and the annular wall are a single component.

17. An instrument as claimed in any one of claim 7, wherein the first and second light sources are luminescently isolated from one another.

18. An instrument as claimed in claim 17, wherein the first and second light sources are luminescently isolated from one another by a first tube having a radius larger than the radius first ring of the first LEDs and smaller than the radius of the second ring of the second LEDs.

19. An instrument as claimed in claim 18, wherein the first tube has a funnel shaped end forming the second light deflector.

20. An instrument as claimed in any one of claim 19, wherein the substantially first tube is made from acrylonitrile-butadiene-styrene.

21. An instrument as claimed in any one of claim 7, wherein the pointer assembly includes a light absorbing cap to absorb undeflected light located over the pointer hub and away from the front surface.

22. An instrument as claimed in claim 21, wherein the light absorbing cap is substantially circular and has a radius greater than the radius of the second ring of second LEDs so as to substantially obscure the first and second light sources from direct view.

* * * * *

UNITED STATES PATENT AND TRADEMARK OFFICE
CERTIFICATE OF CORRECTION

PATENT NO.       : 7,475,999 B2
APPLICATION NO.  : 11/740126
DATED            : January 13, 2009
INVENTOR(S)      : Samir Mezouari Page 1 of 1

It is certified that error appears in the above-identified patent and that said Letters Patent is hereby corrected as shown below:

In the Claims

In column 9, claim 3, line 26, after "light deflectors" delete "means".

In column 10, claim 7, line 1, after "being mounted" delete "adiacent" and substitute --adjacent-- in its place.

In column 10, claim 7, line 2, after "dial and being" delete "nivotable" and substitute --pivotable-- in its place.

Signed and Sealed this

Nineteenth Day of May, 2009

JOHN DOLL
*Acting Director of the United States Patent and Trademark Office*